United States Patent
Lee et al.

(10) Patent No.: US 7,858,008 B2
(45) Date of Patent: Dec. 28, 2010

(54) PROFILE-EXTRUDED POLY(VINYL CHLORIDE) ARTICLES AND METHOD OF MAKING SAME

(75) Inventors: Sang H. Lee, Westlake, OH (US); Robert B. Hooks, Vermillion, OH (US)

(73) Assignee: PolyOne Corporation, Avon Lake, OH (US)

(*) Notice: Subject to any disclaimer, the term of this patent is extended or adjusted under 35 U.S.C. 154(b) by 421 days.

(21) Appl. No.: 11/677,748

(22) Filed: Feb. 22, 2007

(65) Prior Publication Data

US 2007/0155864 A1 Jul. 5, 2007

Related U.S. Application Data

(62) Division of application No. 10/772,213, filed on Feb. 4, 2004, now Pat. No. 7,198,840.

(60) Provisional application No. 60/449,951, filed on Feb. 25, 2003.

(51) Int. Cl.
*B29C 47/60* (2006.01)
*B29C 47/00* (2006.01)
*B29C 47/76* (2006.01)

(52) U.S. Cl. .................. 264/211.23; 264/101; 264/102; 264/167; 264/177.1; 264/177.16; 264/177.2; 264/211.21; 428/297.4; 428/299.4; 524/13

(58) Field of Classification Search ....................... None
See application file for complete search history.

(56) References Cited

U.S. PATENT DOCUMENTS

| | | | |
|---|---|---|---|
| 2,753,595 A | 7/1956 | Dulmage | |
| 3,486,193 A * | 12/1969 | Christensen et al. | 425/203 |
| 3,655,850 A * | 4/1972 | Woodham et al. | 264/118 |
| 3,670,056 A | 6/1972 | Heiberger et al. | |
| 3,712,594 A * | 1/1973 | Schippers et al. | 366/75 |
| 3,712,776 A * | 1/1973 | Woodham et al. | 425/202 |
| 3,714,315 A | 1/1973 | Minton et al. | |
| 3,992,500 A | 11/1976 | Kruder et al. | |
| 4,001,172 A * | 1/1977 | Steinkamp et al. | 524/504 |
| 4,003,874 A | 1/1977 | Ide et al. | |
| 4,015,832 A * | 4/1977 | Kruder | 366/76.1 |
| 4,102,106 A * | 7/1978 | Golder et al. | 52/533 |
| 4,423,960 A | 1/1984 | Anders | |
| 4,491,553 A * | 1/1985 | Yamada et al. | 264/51 |
| 4,496,692 A | 1/1985 | Riew et al. | |
| 4,514,449 A * | 4/1985 | Budich et al. | 428/76 |
| 4,536,360 A * | 8/1985 | Rahrig | 264/142 |
| 4,573,799 A * | 3/1986 | Anders | 366/89 |
| 4,616,989 A * | 10/1986 | Mewes et al. | 425/203 |
| 4,708,623 A * | 11/1987 | Aoki et al. | 425/202 |

(Continued)

OTHER PUBLICATIONS

Rauwendaal, Polymer Extrusion pp. 458-476 (1986).

(Continued)

*Primary Examiner*—Jeffrey Wollschlager
(74) *Attorney, Agent, or Firm*—John H. Hornickel

(57) ABSTRACT

A profile-extruded article is disclosed, made of a fiber-reinforced polymer of vinyl-chloride monomer, wherein the article has a ratio of actual specific gravity to theoretical specific gravity of nearly unity. A method of making the article is also disclosed.

8 Claims, 2 Drawing Sheets

U.S. PATENT DOCUMENTS

| | | | |
|---|---|---|---|
| 4,801,627 A | | 1/1989 | Rahrig et al. |
| 4,820,763 A | | 4/1989 | Yang |
| 4,870,126 A | * | 9/1989 | Kinson et al. ............... 524/521 |
| 4,874,858 A | | 10/1989 | Magistro |
| 5,008,145 A | | 4/1991 | Kinson et al. |
| 5,059,476 A | | 10/1991 | Steiniger et al. |
| 5,064,293 A | * | 11/1991 | Nakamura ................... 366/324 |
| 5,080,968 A | | 1/1992 | Riew et al. |
| 5,141,042 A | | 8/1992 | Schwaegerle |
| 5,141,426 A | * | 8/1992 | Capelle ....................... 425/203 |
| 5,194,498 A | * | 3/1993 | Stevenson et al. ............ 525/81 |
| 5,221,504 A | * | 6/1993 | Capelle ................. 264/211.23 |
| 5,281,379 A | * | 1/1994 | Noguchi et al. ............ 264/102 |
| 5,358,024 A | | 10/1994 | Schwaegerle |
| 5,380,786 A | | 1/1995 | Greenlee et al. |
| 5,494,718 A | | 2/1996 | Adams et al. |
| 5,497,594 A | * | 3/1996 | Giuseppe et al. .............. 52/843 |
| 5,735,599 A | * | 4/1998 | Ishibashi et al. .............. 366/82 |
| 5,858,522 A | * | 1/1999 | Turk et al. ............... 428/308.8 |
| 5,882,564 A | * | 3/1999 | Puppin ................. 264/177.16 |
| 6,015,611 A | * | 1/2000 | Deaner et al. ................ 428/326 |
| 6,062,719 A | | 5/2000 | Busby et al. |
| 6,093,359 A | | 7/2000 | Gauchel et al. |
| 6,132,076 A | * | 10/2000 | Jana et al. ..................... 366/81 |
| 6,136,246 A | * | 10/2000 | Rauwendaal et al. ... 264/211.21 |
| 6,190,581 B1 | | 2/2001 | Duffin, Jr. et al. |
| 6,210,616 B1 | * | 4/2001 | Suwanda ................... 264/151 |
| 6,216,608 B1 | | 4/2001 | Woods et al. |
| 6,328,919 B1 | * | 12/2001 | Pham et al. .............. 264/177.1 |
| 6,352,039 B1 | | 3/2002 | Woods et al. |
| 6,365,710 B1 | | 4/2002 | Wang et al. |
| 6,428,728 B1 | * | 8/2002 | Sakai et al. ............ 264/171.13 |
| 6,464,913 B1 | * | 10/2002 | Korney, Jr. .................. 264/102 |
| 6,513,963 B2 | * | 2/2003 | Derezinski .................... 366/89 |
| 6,565,784 B1 | * | 5/2003 | Esseghir et al. ............. 264/141 |
| 6,593,403 B1 | * | 7/2003 | Simon et al. ................ 524/114 |
| 6,682,814 B2 | * | 1/2004 | Hendrickson et al. ....... 428/326 |
| 6,821,599 B1 | | 11/2004 | Kuroda et al. |
| 7,030,179 B2 | * | 4/2006 | Patterson et al. .............. 524/13 |

OTHER PUBLICATIONS

Meijer et al. Polymer Engineering and Science vol. 28, No. 5, pp. 282-284 (1988).
Gibbons et al., "Extrusion", Modern Plastics Encyclopedia pp. 220-234 (1986-1987).
Fiberloc.RTM. 97510 Vinyl Compound Technical Data Sheet (2001).
Fiberloc.RTM. 97520 Vinyl Compound Technical Data Sheet (2001).
Fiberloc.RTM. 97530 Vinyl Compound Technical Data Sheet (2001).
"Sheet Extrusion of Geon.RTM. Rigid PVC Compounds" PolyOne Technical Service Report No. 1 (1995).
"Extrusion of Geon.RTM. Rigid Cellular Vinyl" PolyOne Technical Service Report No. 7 (1993).
"Extruding Cubes of Rigid Geon.RTM. Vinyls into Profiles" PolyOne Technical Service Report No. 13 (1992).

* cited by examiner

PROFILE-EXTRUDED POLY(VINYL CHLORIDE) ARTICLES AND METHOD OF MAKING SAME

CLAIM OF PRIORITY

This application claims priority from U.S. Provisional Patent Application Ser. No. 60/449,951 filed on Feb. 25, 2003.

FIELD OF THE INVENTION

This invention relates to fiber-reinforced poly(vinyl chloride) articles and a method for making such articles by profile extrusion.

BACKGROUND OF THE INVENTION

People benefit from plastic articles. From their invention in the mid-20$^{th}$ Century until the present, thermoplastic polymers have become the composition of many consumer products. Such products are relatively lightweight, sturdy, and corrosion resistant.

Plasticized poly(vinyl chloride), invented by Waldo Semon of B.F. Goodrich, has been a top performing plastic resin for decades. Millions of kilograms of poly(vinyl chloride) (also known as "PVC") resin are extruded and molded each year into countless products. With conventional additives, poly(vinyl chloride) provides unparalleled durability, flame resistance, and value.

Reinforced poly(vinyl chloride) has been especially useful in the plastics industry. Fiberloc™ Vinyl Composites, made by PolyOne Corporation of Cleveland, Ohio USA, combine the inherent properties of poly(vinyl chloride) with the strength, stiffness and dimensional stability of glass fibers. Fiberloc™ Vinyl Composites are significantly stronger, stiffer, and more resistant to thermal expansion/contraction than traditional vinyl compounds. For example, the flexible modulus with a 30 percent by weight fiber-reinforced poly(vinyl chloride) article can exceed 1,000,000 pounds/square inch (6,894 megapascals). They offer properties closer to metal but with advantages such as lighter-weight parts, corrosion resistance, and the ability to consolidate parts. These composites have broad applications and are commonly used in pump housings, window and door accessories, and construction structures.

SUMMARY OF THE INVENTION

The art of extruding poly(vinyl chloride), especially fiber-reinforced poly(vinyl chloride), has complications. The ability to achieve a relatively non-porous product is difficult, especially if the article being extruded is not a sheet, i.e., it has a three dimensional profile greater than the flatness that a sheet has. Therefore, profile extrusion of fiber-reinforced poly(vinyl chloride) has been quite limited in value because porosity could not be effectively controlled. The increased stiffness to be achieved with fiber reinforcement of the poly(vinyl chloride) article is significantly diminished or lost because of the inherent porosity remaining in the article after it has been profile-extruded.

The present invention solves the problem of profile-extrusion of fiber-reinforced poly(vinyl chloride) by providing a means to achieve a ratio of actual specific gravity to theoretical specific gravity of nearly unity. Indeed, the present invention unlocks the ability to make and use a profile extruded poly(vinyl chloride) article that is fiber-reinforced and has essentially no porosity throughout its mass and at its exposed surfaces.

Thus, one aspect of the present invention is a profile-extruded article is disclosed, made of a fiber-reinforced polymer of vinyl-chloride monomer, wherein the article has a ratio of actual specific gravity to theoretical specific gravity of nearly unity.

"Theoretical specific gravity" is the optimum specific gravity possible without voids for a given formulation of a polymer, as measured using ASTM Test D792.

"Actual specific gravity" is the real specific gravity of that given formulation of a polymer, as measured by the same ASTM Test D792. Actual specific gravity is dependent on processing conditions, product formulation, and porosity.

"Nearly unity" means that the value of the actual specific gravity nearly equals the theoretical specific gravity of a given formulation of a polymer. In other words, the ratio of actual to theoretical specific gravity approaches the ideal of 1.0. How close the ratio approaches the ideal of 1.0 can vary from formulation to formulation and from use to use. However, a ratio of nearly unity and how to achieve that goal for a given poly(vinyl chloride) article gives unexpected advantages to the poly(vinyl chloride) article made by profile extrusion.

One advantage of a profile-extruded poly(vinyl chloride) article having a "nearly unity" ratio is that the article has essentially no porosity throughout its mass and at its exposed surfaces. The resulting article is more desirable than conventional poly(vinyl chloride) articles because its exposed surface is smoother, its interior mass is more homogenous and contains much less voids.

Another advantage of a "nearly unity" ratio is the ability to achieve nearly optimal properties from the product formulation.

Another aspect of the present invention is a method of making a fiber-reinforced poly(vinyl chloride)-containing article, comprising the steps of: (a) feeding granules of PVC reinforced with fibers into a two-stage, single-screw extrusion apparatus that has a vent at the beginning of the second stage for devolatilization of outgasses during extrusion; and (b) extruding fiber-reinforced poly(vinyl chloride) through a profile extrusion die. Granules can be pellets or cubes.

Other advantages will be described in relation to the embodiments of the invention, explained in conjunction with the following digital image drawings.

EMBODIMENTS OF THE INVENTION

Fiber-Reinforced Poly(Vinyl Chloride)

Figure 1:
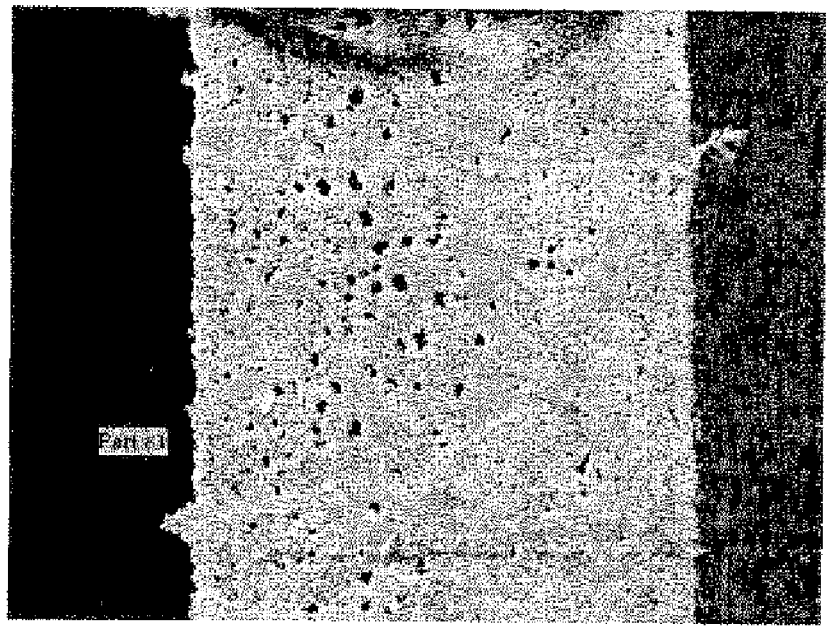
FIG. 1 is a digital image of internal porosity of a fiber-reinforced composition of the prior art.

Poly(vinyl chloride) containing fiber reinforcement, particularly glass fiber reinforcement, is well known in the art. PolyOne Corporation of Avon Lake, Ohio is a world leader in the manufacture and marketing of fiber-reinforced poly(vinyl chloride) using the brand Fiberloc™ Vinyl Composites and has an Internet Web Site at www.polyone.com. The technology of fiber-reinforced poly(vinyl chloride) products is disclosed in U.S. Pat. Nos. 4,496,692; 4,536,360; 4,801,627; 4,820,763; 4,870,126; 4,874,858; 5,008,145; 5,059,261; 5,059,476; 5,080,968; 5,141,042; 5,358,024; 5,380,786; 5,494,718; 6,216,608; 6,352,039, all of which are incorporated herein by reference.

The poly(vinyl chloride) is a polymer of vinyl chloride monomer. The polymer can have a molecular weight (weight average) ranging from about $30 \times 10^3$ to about $168 \times 10^3$, and preferably from about $40 \times 10^3$ to about $106 \times 10^3$. Alternatively expressed, the polymer can have an inherent viscosity ranging from about 0.45 to about 1.60, and preferably from about 0.52 to about 0.92.

Poly(vinyl chloride) is a resin commercially available in a variety of grades from such suppliers as Oxyvinyls, LP of Dallas, Tex., which has an Internet Web Site at www.oxyvinyls.com.

Fibers can be reinforcing synthetic fibers (such as glass, nylon, & graphite) or naturally occurring fibers such as biofiber (such as cellulose or wood). Glass fibers are preferred for the increased flexural modulus.

When the fibers are glass, the amount of reinforcement provided by the fibers can be determined by the needs of those skilled in the art without undue experimentation. Preferably, the glass fibers are conventionally sized with known aminosilane coupling agents and film formers, surfactants, lubricants and the like. As stated above, the technology of fiber-reinforced poly(vinyl chloride) products is disclosed in U.S. Patents identified above.

The length of the glass fibers in the form of chopped strands ranges from about 1 mm to about 27 mm long, preferably less than 5 mm long. When producing pellets or cubes, of a size in the range from about 3 mm to about 8 mm in diameter or width, respectively, even shorter glass fiber lengths, generally less than 1 mm will be encountered because, during compounding, considerable fragmentation will occur, some fibers being as short as 100 µm.

The best properties of the thermoformed composites are obtained when the glass fibers are present in an amount in the range from about 5% to about 40% by wt, based on the wt of combined glass fibers and resin; and the fibers are in the range from about 500 µm to about 1 mm long. It will be appreciated that less than 5% by weight fibers has little reinforcing value, and more than about an equal part by weight of glass fibers, relative to the amount of poly(vinyl chloride) resin, results in a mixture which cannot be satisfactorily processed.

Glass fibers are commercially available in a variety of grades from such suppliers as Owens Corning of Toledo, Ohio, USA, which has an Internet Web Site at www.owenscorning.com.

For the profile-extruded fiber reinforced poly(vinyl chloride) articles of the present invention, the ratio of actual specific gravity to theoretical specific gravity is better than known current products, to wit: about 0.87, desirably at least about 0.90 and preferably at least about 0.95. More preferably, the ratio is at least about 0.97. Most preferably, the ratio is at least about 0.99. The closer the number to unity, the better the physical properties.

In addition to poly(vinyl chloride) and fiber, the product can contain a variety of optional additives known to those skilled in the art such as fillers like talc, mica, clay and the like, light stabilizers, heat stabilizers, antioxidants, pigments and dyes as may be required for a particular purpose, it being recognized that the amount of the additive(s) used will affect the physical properties of the thermoformed composite. As stated above, the technology of fiber-reinforced poly(vinyl chloride) products is disclosed in U.S. Patents identified above.

Commercially available fiber-reinforced pellets or cubes for extrusion and molding include Grades 97510, 97520, and 97530 Fiberloc™ Vinyl Composites from PolyOne Corporation of Avon Lake, Ohio.

Processing of Fiber-Reinforced Poly(Vinyl Chloride)

Profile extrusion has been conventionally performed on a single stage, single screw extruder having a length/diameter ratio of about 24:1 without venting.

The present invention performs the processing using a two stage, single screw extruder having a length/diameter ratio of about 30:1 with negative-pressure venting at the beginning of the second stage.

Unexpectedly, the transition from a single stage extruder to a two stage extruder permits the melted or partially melted glass reinforced PVC to be devolatilized at the beginning of the second stage. This devolatilization permits the resulting extrusion product to achieve a nearly unity ratio of at least about 0.90. However, any style of extruder that can devolatilize the poly(vinyl chloride) melt during profile extrusion can be useful in the present invention.

Extruders are designed to continuously execute the following unit operations in rapid succession:
1.) feeding of pelletized or diced granules of glass reinforced PVC from the extruder hopper to the feed zone of the screw,
2.) compression of the fed granules in the transition zone of the screw along with melting of the compressed material at the barrel/material interface,
3.) continued melting along with dispersive mixing in the metering/mixing zone of the screw,
4.) decompression of compressed and melted/partially melted material at the start of the second zone of the screw,
5.) devolatilization of the decompressed material to remove volatiles including moisture,
6.) build-up of melt pressure and conveying of the devolatilized melt to the die, and
7.) extrusion of the composite through a selected die for profile or sheet extrusion.

Suitable extruders have means for continuously transporting materials between zones where these unit operations are performed. The materials conveyed between zones include particulate solids, viscous fluxed polymer, and fluxed polymer-like mixtures. Particulate solids include, for example, reinforcing synthetic fibers (such as glass, nylon, & graphite), biofiber, high molecular weight polymer resins (like poly (vinylchloride), low molecular weight resins (stabilizers, lubricants, impact modifiers, & compatiblizers) and pigments (such as titanium dioxide & carbon black), fillers (such as mica, calcium carbonate & talc) etc.

Suitable extruders for practicing the novel process include, but are not limited to continuous process high shear mixers such as: industrial melt-plasticating extruders, available from a variety of manufacturers including, for example, Cincinnati-Millicron, Krupp Werner & Pfleiderer Corp., Ramsey, N.J. 07446, American Leistritz Extruder Corp.; Somerville, N.J. 08876; Berstorff Corp., Charlotte, N.C.; and Davis-Standard Div. Crompton & Knowles Corp., Paweatuck, Conn. 06379. Kneaders are available from Buss America, Inc.; Bloomington, Ill.; and high shear mixers alternatively known as Gelimat™ available from Draiswerke G.m.b.H., Mannheim-Waldhof, Germany; and Farrel Continuous Mixers, available from Farrel Corp., Ansonia, Conn. The screw components used for mixing, heating, compressing, and kneading operations are shown and described in Chapter 8 and pages 458-476 of Rauwendaal, *Polymer Extrusion*, Hanser Publishers, New York (1986); Meijer, et al., "The Modeling of Continuous Mixers. Part 1: The Corotating Twin-Screw Extruder", Polymer Engineering and Science, vol. 28, No. 5, pp. 282-284 (March 1988); and Gibbons et al., "Extrusion", *Modern Plastics Encyclopedia* (1986-1987).

The inventive process unit operations can be accomplished using wide ranging extruder barrel and screw configurations.

The extruder barrel can have a L/D ratio ranging from 20:1 to 40:1, with the higher value preferred for the present invention.

Screw configurations can range from increasing pitch to standard to decreasing pitch to double flighted to two stage vented. Screw designs can include mixing pins and slotted disks to aid in mixing at a desired location of the melting and mixing of the ingredients.

The knowledge necessary to select extruder barrel elements and assemble extruder screws is readily available from various extruder suppliers and is well known to those of ordinary skill in the art of fluxed polymer plastication. Vacuum ports operate under vacuum of sufficient strength to remove volatile products from the composite but of insufficient strength to remove the composite from the extruder. Suitable negative operating pressures for vacuum ports are in the range of from 2 to 95 kilopascals.

The volatile products to be removed from the beginning of a second stage of a single screw extruder, especially at a barrel vacuum port, contain, among other things, residual traces of moisture, and other volatiles from the ingredients that make up the fiber-reinforced poly(vinyl chloride) composite.

Usefulness of the Invention

Fiber-reinforced poly(vinyl chloride) polymer composite is densified according to the technique of the present invention. It is believed that applying a negative pressure to an extruder barrel vent to remove volatiles and other impurities has not been performed with fiber-reinforced poly(vinyl chloride), because most single screw extruders are 24:1 L/D non-vented extruders.

The results of reduced porosity are apparent when examining the actual specific gravities of fiber-reinforced poly (vinyl chloride) articles made according to conventional methods and made according to the present invention.

Figure 2:
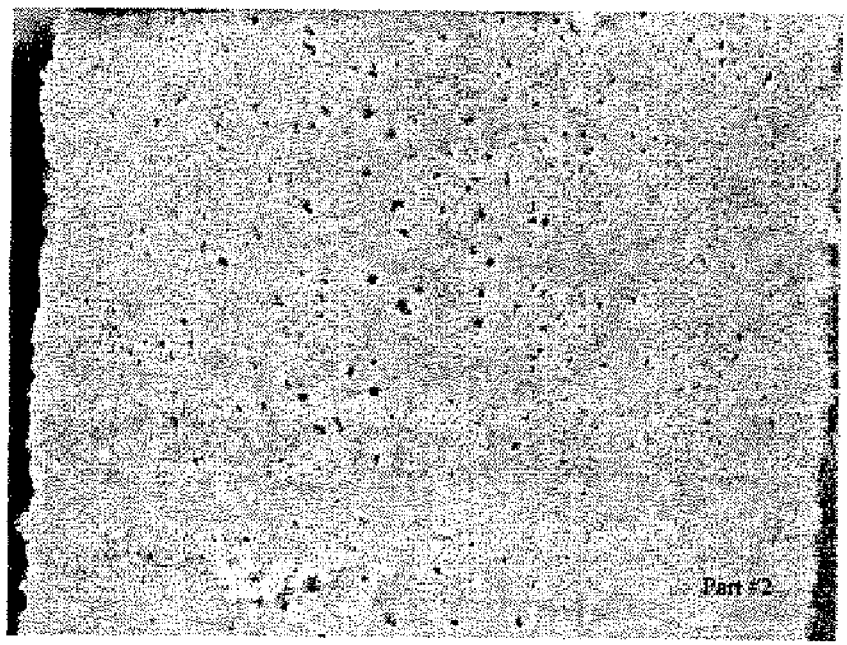
FIG. 2 is a digital image of internal porosity of a second fiber-reinforced composition of the prior art.
Figure 3:
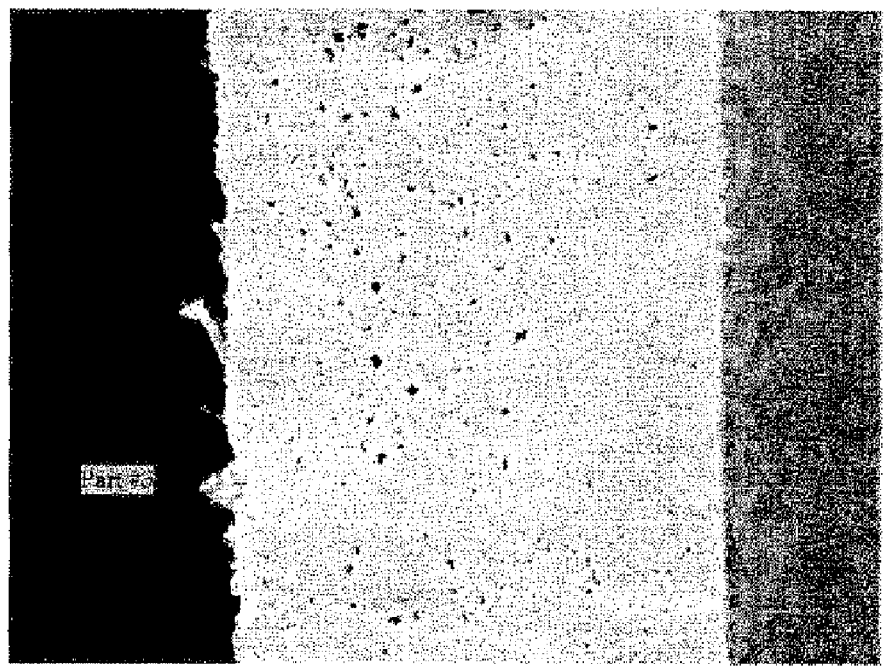
FIG. 3 is a digital image of internal porosity of a third fiber-reinforced composition of the prior art.
Figure 4:
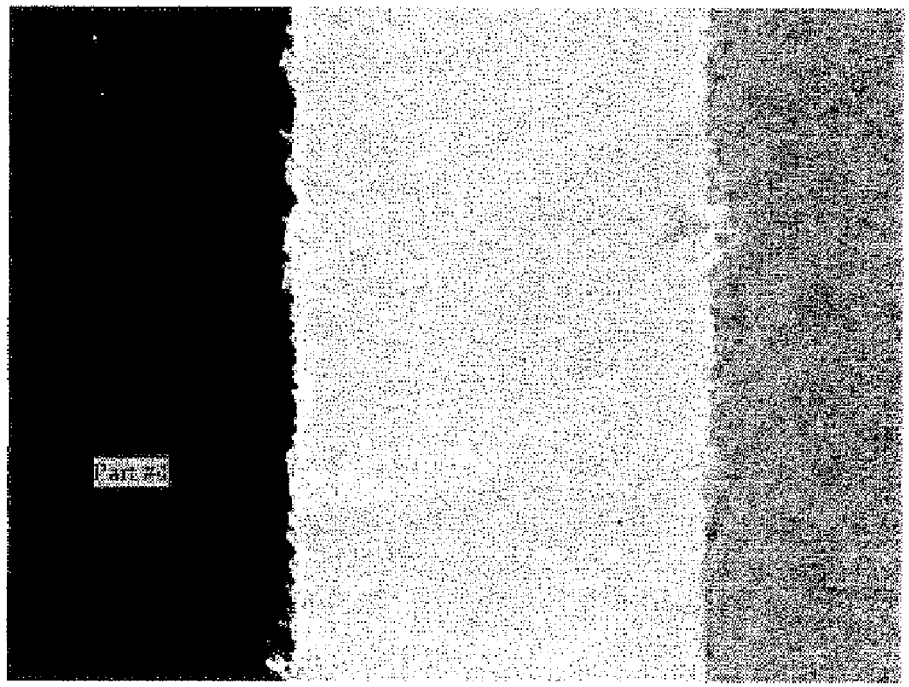
FIG. 4. is a digital image of internal porosity of a fiber-reinforced composition prepared according to the present invention.

Table 1 shows three prior art Comparison Examples A-C and Example 1 of the present invention. FIGS. 1-4 match the Examples A-C and 1 and are digital images of cross-sections of the examples, stored in jpeg format, using a Nikon optical microscope, taken at 20× magnification. Actual specific gravity was determined according to ASTM Method No. D792. Theoretical specific gravity was determined according to D792 using injection-molded plaques. Glass fiber content of 30% for each example represents the matches maximum loading of fiber into poly(vinyl chloride) to make a commercial fiber-reinforced poly(vinyl chloride) article.

Comparison Example A is a piece of soffit form from a Fiberloc™ product kit believed to be prepared by non-vented, single screw extrusion with Grade 97530 Fiberloc™ Vinyl Composite—Extrusion Compound.

Comparison Example B is a round tube (3.17 cm diameter) from the same Fiberloc™ product kit prepared in the same manner with Grade 97530 Fiberloc™ Vinyl Composite—Extrusion Compound.

Comparison Example C is square tube (3.17 cm wide) believed to have been prepared on a 24:1 non-vented extruder which was vacuum sized and had a very smooth barrel surface with Grade 97530 Fiberloc™ Vinyl Composite—Extrusion Compound.

Example 1 is a profile part for a customer extruded on a two stage, single screw 30:1 vented extruder with mixing pins at the end of the first stage with Grade 97530 Fiberloc™ Vinyl Composite—Extrusion Compound.

TABLE 1

| Example - FIG. No. | Glass Fiber Content | Actual Specific Gravity | Theoretical Specific Gravity | Ratio of Actual to Theoretical |
|---|---|---|---|---|
| A - FIG. No. 1 | 30% | 1.34 | 1.62 | 0.827 |
| B - FIG. No. 2 | 30% | 1.39 | 1.62 | 0.858 |
| C - FIG. No. 3 | 30% | 1.36 | 1.62 | 0.839 |
| 1 - FIG. No. 4 | 30% | 1.61 | 1.62 | 0.994 |

Besides the numerical data showing the significant difference in ratio of actual to theoretical specific gravity, the FIGS. 1-4 are most demonstrative of the utility and advantages of the present invention. The significant reduction in porous voids in the interior of the Example 1 cross-section, as compared with any of the Examples A-C cross-sectional images, is most noticeable.

At a minimum, the improvement of the actual specific gravity for product of the present invention over the actual specific gravities of the prior art extruded products is 15.8% [(0.994−0.858)/0.8581]. This is most unexpected, considering that the maximum improvement possible is 16.5% [(1.00−0.858)/0.858].

Thus, the present invention has unexpectedly closed 95% of the existing gap between actual and theoretical specific gravity in glass-fiber reinforced poly(vinyl chloride). This invention yields a much more homogenous product, approaching the optimal theoretical properties of the fiber reinforced poly(vinyl chloride).

The invention is not limited to the above embodiments The claims follow.

What is claimed is:

1. A method of making a fiber-reinforced poly(vinyl chloride)-containing article, comprising the steps of:
    (a) feeding granules of poly(vinyl chloride) reinforced with fibers into a two-stage, single-screw extrusion apparatus that has mixing pins at the end of the first stage and a vent only at the beginning of the second stage for devolatilization of outgasses during extrusion; and
    (b) extruding the fiber-reinforced poly(vinyl chloride) through a profile extrusion die, wherein the granules contain fibers in an amount up to about 30 percent by weight of the article,
    wherein between step (a) and step (b) the following steps occur in rapid succession:
        (1) compression of the fed granules in a transition zone of the first stage of the screw along with melting of the compressed material at a barrel/material interface,
        (2) continued melting without decompression or devolatilization along with dispersive mixing in a metering/mixing zone in the first stage of the screw,
        (3) decompression for the first time of compressed and melted/partially melted material at the beginning of the second stage of the screw,
        (4) devolatilization of the decompressed material for the first time through the only vent to remove volatiles including moisture, and
        (5) build-up of melt pressure and conveying of the devolatilized melt to the die, and wherein the fiber-reinforced poly(vinyl chloride) extruded through the profile die has a ratio of actual specific gravity to theoretical specific gravity that ranges from about 0.90 to about 0.99.

2. The method of claim 1, wherein the extrusion apparatus has a L/D ratio ranging from 20:1 to 40:1.

3. The method of claim 2, wherein screw configurations are selected from the group consisting of increasing pitch, standard, decreasing pitch, double flighted, and combinations thereof.

4. The method of claim 3, wherein the screw also includes slotted disks.

5. The method of claim 1, wherein the decompression is in the range of from 2 to 95 kilopascals.

6. The method of claim 1, wherein the ratio of actual specific gravity to theoretical specific gravity ranges from about 0.95 to about 0.99.

7. The method of claim 1, wherein the ratio of actual specific gravity to theoretical specific gravity ranges from about 0.97 to about 0.99.

8. The method of claim 1, wherein the fiber is glass.

* * * * *